United States Patent
Austin 3,883,529
May 13, 1975

[54] NEW CELLULOSE REACTIVE DYESTUFFS

[75] Inventor: Peter William Austin, Blackley, Manchester, England

[73] Assignee: Imperial Chemical Industries Limited, London, England

[22] Filed: Dec. 4, 1972

[21] Appl. No.: 311,522

[30] Foreign Application Priority Data
Dec. 15, 1971 United Kingdom............... 58228/71

[52] U.S. Cl. ......................... 260/249.5; 8/12; 8/54; 8/54.2; 8/62; 8/78 R; 260/240 B; 260/247.5 R; 260/250 R; 260/251 Q; 260/256 R; 260/294.8 G; 260/336; 260/543 R; 260/556
[51] Int. Cl. ..................... C07d 55/18; C07d 55/20
[58] Field of Search............... 260/249.5, 240 B, 336

[56] References Cited
UNITED STATES PATENTS
3,647,827  3/1972  Sigiyama et al.................. 260/372

*Primary Examiner*—John D. Randolph
*Attorney, Agent, or Firm*—Cushman, Darby & Cushman

[57] ABSTRACT

Reactive dyestuffs of, the triphenylmethane or xanthene series having the formula:

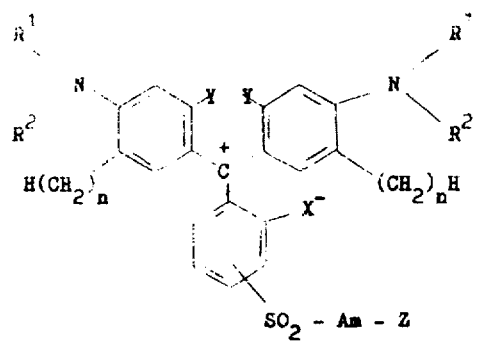

wherein $R^1$ represents H or an alkyl group and $R^2$ represents an alkyl, aryl or substituted aryl group, or $R^1$ and $R^2$ together form with the N atom a five or six-membered heterocyclic ring, each $n$ independently represents 0 or 1, each Y independently represents H, a methyl group or the two together represent an oxygen atom, $X^-$ represents $SO_3^-$ or may be $CO_2^-$ if Y, Y is $-O-$, Am is the NH group or an amine or a diamine radical having the $SO_2$ group attached to the nitrogen or one of the two nitrogen atoms, and Z is a cellulose-reactive group attached to a carbon or nitrogen atom in the radical Am.

They provide brilliant yellowish-red to bluish-red shades having a surprisingly high lightfastness.

2 Claims, No Drawings

NEW CELLULOSE REACTIVE DYESTUFFS

This invention relates to new cellulose-reactive dyestuffs and more particularly to new cellulose-reactive dyestuffs of the triphenylmethane or xanthene series.

It has been found that valuable cellulose-reactive dyes having the extremely bright shades characteristic of these series but with an unexpectedly high degree of light-fastness can be obtained by having a cellulose-reactive group linked through an amine or diamine residue to a sulphonyl group in one of the phenyl nuclei in certain members of these series.

According to the invention there are provided the dyestuffs of the formula:

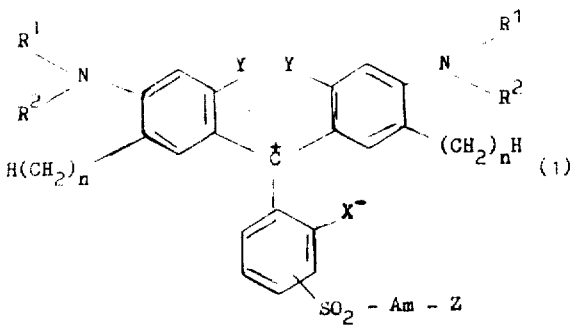

wherein $R^1$ represents H or an alkyl group and $R^2$ represents an alkyl, aryl or substituted aryl group, or $R^1$ and $R^2$ together form with the N atom a five or six-membered heterocyclic ring, each $n$ independently represents 0 or 1, each Y independently represents H, a methyl group or the two together represent an oxygen atom, $X^-$ represents $SO_3^-$ or may be $CO_2^-$ if Y, Y is —O—, Am is the NH group or an amine or a diamine radical having the $SO_2$ group attached to the nitrogen or one of the 2 nitrogen atoms, and Z is a cellulose-reactive group attached to a carbon or nitrogen atom in the radical Am.

The alkyl groups represented by $R^1$ and $R^2$ in formula (1) may be of any length but are preferably those containing up to 4 carbon atoms, e.g. methyl, ethyl, n-propyl, and n-butyl.

As examples of aryl or substituted aryl radicals represented by $R^2$ there may be mentioned more especially radicals of the benzene series in which the benzene ring or rings may be substituted, eg by halogen atoms eg F, Cl or Br, $CF_3$ or $NO_2$.

As examples of cellulose-reactive groups represented by Z, there may be mentioned aliphatic sulphone groups which contain a sulphate ester group in β-position to the sulphur atom, eg the β-sulphatoethylsulphone group, α,β-unsaturated acyl radicals of aliphatic carboxylic acids for example, acrylic acid, α-chloroacrylic acid, propiolic acid, maleic acid and mono- and dichloro-maleic acids; also the acyl radicals of the acids which contain a substituent which reacts with cellulose or polyamides in the presence of an alkali, eg the radical of a halogenated aliphatic acid such as chloroacetic acid, β-chloro and β-bromo-propionic acids and α,β-dichloro and dibromo-propionic acids. Other examples of cellulose or polyamide-reactive groups are tetrafluorocyclobutane carbonyl, trifluorocyclobutene carbonyl, tetrafluorocyclobutylethenyl carbonyl, trifluorocyclobuteneethenyl carbonyl, and heterocyclic radicals which contain 2 or 3 nitrogen atoms in the heterocyclic ring and at least one cellulose-reactive substituent on a carbon atom of the ring.

As examples of such heterocyclic radicals, there may be mentioned, for example

2:3-dichloro-quinoxaline-5- or -6-sulphonyl,
2:3-dichloro-quinoxaline-5- or -6-carbonyl,
2:4-dichloro-quinazoline-6- or -7-sulphonyl,
2:4:6-trichloro-quinazoline-7- or -8-sulphonyl,
2:4:7- or 2:4:8-trichloro-quinazoline-6-sulphonyl,
2:4-dichloro-quinazoline-6-carbonyl,
1:4-dichloro-phthalazine-6-carbonyl,
4:5-dichloro-pyridaz-6-on-1-yl,
2:4-difluoro-5-chloro pyrimid-6-yl,
2:4-dichloro-pyrimidine-5-carbonyl,
2-methyl sulphonyl-5-chloro-6-methyl pyrimid-4-yl,
4(4:5-dichloro-pyridaz-6-on-1-yl) benzoyl,
4-(4:5-dichloro-pyridaz-6-on-1-yl)-phenyl-sulphonyl and, more particularly s-triazin-2-yl and pyrimidin-2-yl or 4-yl radicals which contain on at least one of the remaining 2,4- and 6-positions, a bromine or, preferably, a chlorine atom, a sulphonic acid group, a thiocyanato group, an aryloxy or arylthio group containing an electronegative substituent such as sulphophenoxy, sulphophenylthio, nitrosulphophenoxy, disulphophenoxy and sulphonaphthoxy, or a group of the formula:

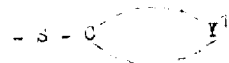

wherein $Y^1$ represents a group of atoms necessary to form a 5- or 6-membered heterocyclic ring which may carry substituents or form part of a fused ring system; or a quaternary ammonium e.g. pyridinium group; or a group of the formula:

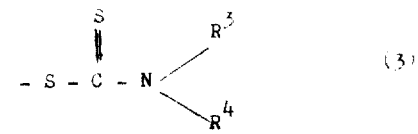

wherein $R^3$ and $R^4$ each represents the same or different alkyl, cycloalkyl, aryl or aralkyl group, or $R^3$ and $R^4$ together form, together with the nitrogen atom, a 5- or 6-membered heterocyclic ring; or a group of the formula:

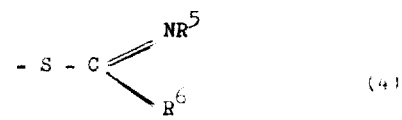

wherein $R^5$ and $R^6$ may be the same or different and each represents a hydrogen atom or an alkyl, aryl or aralkyl group.

In the cases where the pyrimidine ring or triazine ring carries only one such reactive substituent, the said ring may have a non-reactive substituent on the remaining carbon atoms.

By a non-reactive substituent there is meant a group which is bound by a covalent bond to a carbon atom of the triazine or pyrimidine nucleus, which covalent bond is not ruptured under the conditions used for application of the reactive dye.

As examples of such substituents, there may be mentioned, for example, primary amino and hydroxyl groups, also mono- or di-substituted amino groups, eth- :rified hydroxyl and etherified mercapto groups; in the case of substituted amino groups, this class includes for example, mono- and di-alkylamino groups in which the alkyl groups preferably contain at most 4 carbon atoms, and which may also contain substituents for example, hydroxyl or alkoxy groups, and phenylamino and naphthylamino groups preferably containing sulphonic acid substituents; in the case of etherified hydroxyl and mercapto groups, this class includes, for example, alkoxy and alkylthio groups preferably those of low molecular weight, i.e. having up to 4 carbon atoms and phenoxy, phenylthio, naphthoxy or naphthylthio groups; as particular examples of all these classes there may be mentioned for example:

Methylamino,
ethylamino,
dimethylamino,
β-hydroxyethylamino,
di-(β-hydroxyethyl)-amino,
β-chloroethylamino,
cyclohexylamino,
anilino,
sulphophenylamino,
disulphophenylamino,
N-methylsulphophenylamino,
N-β-hydroxyethylsulphophenylamino,
mono-, di- and tri-sulphonaphthylamino,
sulpho-o-tolylamino,
carboxyphenylamino and sulphocarboxyphenylamino,
N-ω-sulphomethylphenylamino,
methoxy, ethoxy and butoxy,
phenoxy, methylphenoxy and chlorophenoxy and phenylthio groups.

Chlorine atoms or cyano, nitro, carboxy and carbalkoxy groups in the 5-position of a pyrimidyl radical come into category of non-reactive substituents.

Alternatively the second substituent on a chloro-s-triazine group may be a radical which carries another cellulose-reactive group, e.g. an anilino or naphthylamino group carrying a β-sulphatoethylsulphonyl group attached to a carbon atom of the ring, but more especially the radical of a diamine carrying a mono- or di-chloro-s-triazine group attached to the second nitrogen atom, i.e. a group of the formula:

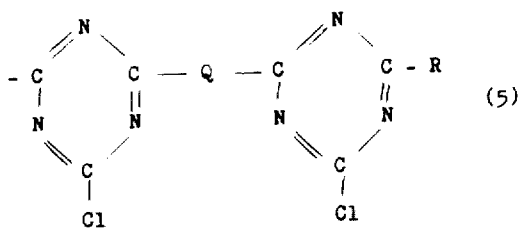

(5)

wherein Q is the N,N'-divalent radical of an aliphatic, aromatic, or heterocyclic diamine and R represents Cl or an amino, substituted amino or etherified hydroxyl group.

As examples of radicals represented by Q, there may be mentioned, e.g. N,N'-piperazinylene, and radicals of the formula:

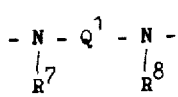

wherein $R^7$ and $R^8$ independently represent H or an alkyl or hydroxyalkyl group of up to 4 carbon atoms, e.g. methyl, ethyl, β-hydroxyethyl, n-propyl, n-butyl and γ-hydroxypropyl, and $Q^1$ is an aliphatic or aromatic radical, e.g. an alkylene, poly(alkyleneimine) or dialkyloxide radical, e.g. ethylene, propylene, tri-, tetra- and hexa-methylenes, $-C_2H_4NHC_2H_4-$, $-C_2H_4(NHC_2H_4)_2-$ and $C_2H_4OC_2H_4$, or a divalent radical of the benzene or naphthalene series which preferably contains 1 or 2 sulphonic acid groups, e.g. a mono- or disulphophenylene or a disulphonaphthylene radical, or a divalent radical of the stilbene, diphenyloxide, diphenylmethane, diphenylurea, diphenoxyethane or diphenylamine series which preferably contains 1 or 2 sulphonic acid groups.

A special class of the new dyestuffs are those in which the reactive group takes the form of formula (5), the radical R being a second triphenylmethane or xanthene residue linked through a $-SO_2Am-$ radical as in formula (1).

The symbol Am may represent e.g. an aniline radical having Z attached to one of the carbon atoms of the benzene ring. More especially, however, Am represents the radical of any aliphatic, aromatic or heterocyclic diamine having an acylatable hydrogen atom on each of the nitrogen atoms, of the kind just discussed in connection with the symbol Q.

The invention also provides a process for the manufacture of the new dyestuffs which comprises reacting a compound of the formula:

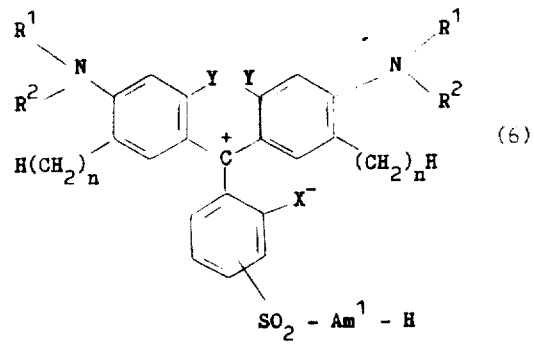

(6)

wherein the symbols $R^1$, $R^2$, $X^-$, Y and n have the meanings stated above and $Am^1$ represents $-NH-$ or the radical of a diamine, with the anhydride or halide of an acid of which the acid radical contains a substituent capable of chemically reacting with the fibre to form a chemical bond, or a heterocyclic compound which contains a halogen atom attached to a carbon atom of the heterocyclic nucleus and also a reactive substituent of the kind just stated.

The above process can conveniently be carried out by stirring a mixture of the reactants in an aqueous medium at a suitable temperature, which may be from 0°C in the case of cyanuric chloride to 50°C or even higher in the case of less reactive acyl halides, anhydrides or heterocyclic compounds. As a general rule it is preferred to add an acid-binding agent during the course of the reaction to maintain the pH within the limits 5 to 8.

The compounds of formula (6) used in the above process can in general be obtained by forming a compound of the formula:

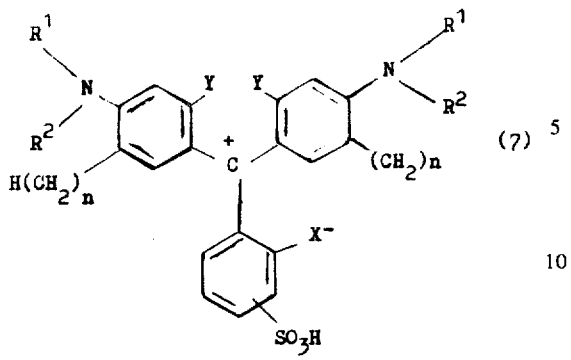

$$(7)$$

by methods known per se, converting this to the sulphon chloride and reacting the latter with ammonia or 1 mole of a diamine of the formula H — (Am) — H. As examples of the latter, there may be mentioned:

piperazine,
aliphatic diamines eg alkylene diamines and other α,ω-diamino aliphatic compounds, eg:
ethylene diamine,
1,2 and 1,3-propylenediamines,
1,6-hexylene diamine,
diethylene triamine,
triethylene tetramine,
di-(β-aminoethyl) ether,
aromatic diamines of the benzene and naphthalene series, more especially those containing 1 or 2 $SO_3H$ groups, eg:
m- and p-phenylenediamine,
1,3-phenylenediamine-4-sulphonic and 4,6-disulphonic acids,
1,4-phenylenediamine-2-sulphonic and 2,5-disulphonic acids,
2,6-naphthylene diamine-4-sulphonic and 4,8-disulphonic acids,
1,5-naphthylene diamine-2- and 4-sulphonic and 3,7-disulphonic acids,
4,4'-diaminodiphenyl-2-sulphonic and 2,2'-disulphonic acids,
4,4'-diaminostilbene-2,2'-disulphonic acid,
4,4'-diaminodiphenylurea-2,2'- and 3,3'-disulphonic acids,
4,4'-diaminodiphenylamine-2,2'-disulphonic acid,
4,4'-diaminodiphenoxyethane-2,2'-disulphonic acid,
4,4'-diaminophenylmethane-2,2'-disulphonic acid,
4,4'-diaminoazobenzene-2-sulphonic and 2,2'-disulphonic acids,
N-methyl and N-ethyl-1,4-phenylenediamine-2-sulphonic acids,
N-(β-hydroxyethyl) ethylene diamine.

As examples of halides or anhydrides of acids or heterocyclic compounds which may be used, there may be mentioned, for example, carbyl sulphate and the anhydrides or acid halides of α-β-unsaturated aliphatic acids such as chloromaleic anhydride, propiolyl chloride and acryloyl chloride, the acid chlorides of halogenated aliphatic acids, eg chloroacetyl chloride,
sulphochloroacetyl chloride,
β-bromo and β-chloro-propionyl chlorides,
α-β-dichloro and dibromo-propionyl chlorides,
2,2,3,3-tetrafluorocyclobutane carbonyl chloride,
β-(2,2,3,3-tetrafluorocyclobutyl) acryloyl chloride,
2,3,3-trifluorocyclobut-1-ene carbonyl chloride,
β-)2,3,3-trifluorocyclobut-1-enyl) acrylyl chloride,
also heterocyclic compounds which contain at least 2 nitrogen atoms in the heterocyclic rings and which contain 2 or more halogen, especially chlorine atoms in the ortho position to the nitrogen atoms, eg 2:3-dichloro-quinoxaline-5- and -6-carbonyl chlorides,
2:3-dichloroquinoxaline-5- and -6-sulphonyl chlorides,
2:4-dichloro-quinazoline-6- and -7-sulphonyl chlorides,
2:4:6-trichloro-quinazoline-7- and -8-sulphonyl chlorides,
2:4:7- and 2:4:8-trichloro-quinazoline-6-sulphonyl chlorides,
2:4-dichloro-quinazoline-6-carbonyl chloride,
1:4-dichloro-phthalazin-6-carbonyl chloride,
2:4-dichloro-pyrimidine-5-carbonyl chloride,
β-(4:5-dichloro-pyridazonyl-1-)propionyl chloride,
1-(4'-chloroformylphenyl)-4:5-dichloro-6-pyridazone,
1-(4'-chlorosulphonylphenyl)-4:5-dichloro-6-pyridazone,
2:4:6-tribromo and trichloro-pyrimidines,
2:4:6-trifluoro-5-chloropyrimidine,
2:4:5:6-tetrachloropyrimidine,
2-methylsulphonyl-4,5-dichloro-6-methyl pyrimidine
5-methyl-2:4:6-trichloropyrimidine,
5-nitro-2:4:6-trichloropyrimidine,
2:4-dichloro-5-nitro-6-methyl-pyrimidine,
2:4-dichloro-5-nitropyrimidine,
2:4:6-trichloro-5-cyanopyrimidine,
5-ethoxycarbonyl-2:4-dichloropyrimidine,
2:4-dichloropyrimidine-5-carbonyl chloride,
cyanuric bromide,
cyanuric chloride:
also the primary condensation products of cyanuric bromide or cyanuric chloride with ammonia, an alkali metal sulphite or thiocyanate or an organic mercaptan, hydroxy compound or an organic primary or secondary amine, for example:
Methanol,
ethanol,
iso-propanol,
phenol,
o-, m- and p-chlorophenols,
o-, m- and p-cresols,
o-, m- and p-sulphophenols,
thiophenol,
thioglycollic acid,
di-methyldithiocarbamic acid,
mercaptobenzthiazole,
thioacetamide,
methyl-,
dimethyl-,
ethyl-,
diethyl-,
n-propyl,
iso-propyl-,
butyl-,
hexyl and cyclohexylamines,
toluidine,
piperidine,
morpholine,
methoxyethylamine,
ethanolamine,
aminoacetic acid,
aniline-2:4-,
2:5- and 3:5-disulphonic acids,
orthanilic, metanilic and sulphanilic acids,
2-, 3- and 4-aminobenzoic acids, 4- and 5-sulpho-2-aminobenzoic acids,
4- and 5-sulpho-o-toluidines,
5-amino-2-hydroxybenzoic acid,
2-amino-ethanesulphonic acid,
amino-naphthalene mono- and disulphonic acids and N-methylaminoethane sulphonic acid;
also, the secondary condensation products of cyanuric chloride with:
alkali metal sulphites,
alkali metal thiocyanates,
phenols and thiophenols,
containing an electronegative substituent, and compounds of the formula:

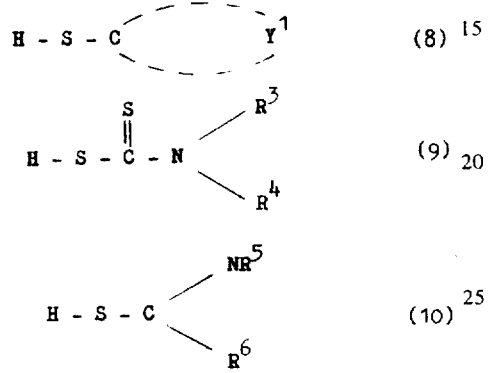

wherein $Y^1$, $R^3$, $R^4$, $R^5$ and $R^6$ have the meanings stated above.

For introducing a reactive group of the kind described by formula (5), the compound of formula (6) can be reacted with a N,N'-bis-(chloro-s-triazinyl)diamine in which at least one of the chloro-s-triazine groups contains two chlorine atoms e.g. the reaction product of any of the diamines mentioned above with two moles of cyanuric chloride, or with one mole of cyanuric chloride and one mole of the primary condensation product of cyanuric chloride and ammonia, a primary or secondary amine or an alcohol or phenol, of the kinds illustrated earlier. When reacting with a bis-(dichloro-s-triazinyl)diamine, the final dyestuff obtained depends upon the proportions reacted; using equimolar proportions, the dyestuff obtained contains a single triphenylmethane or xanthene residue and a reactive group of formula (5) in which R represents a chlorine atom; on the other hand by using two moles of the compound of formula (6) for each mole of the bis-(dichloro-s-triazinyl)diamine, the dyestuff obtained contains two triphenylmethane or xanthene residues linked together by the bis-(chloro-s-triazinyl)diamine residue.

The invention also provides a process for manufacture of the new dyestuffs of the invention in which Am represents the radical of an amine or diamine which comprises reacting together a compound of the formula:

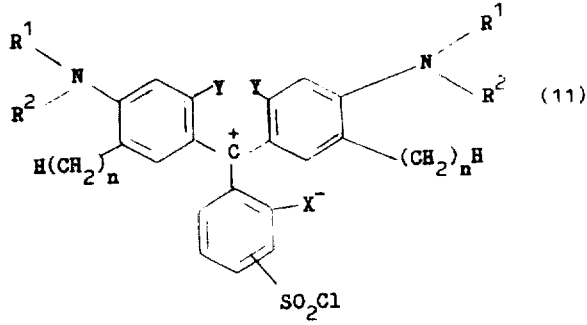

with an amine or diamine of the formula:

$$H — Am — Z \quad (12)$$

the symbols $R^1$, $R^2$, $X^-$, Y, Z, Am and n having the meanings stated.

The above process can conveniently be carried out by stirring a mixture of the reactants in an aqueous medium, preferably at a temperature of from 10° to 40°C and preferably at a pH of from 5 to 7.

The compounds of formula (11) can, in general, be obtained by forming a compound of formula (7) above by methods known per se and converting this to the sulphonchloride.

As examples of compounds of formula (12), there may be mentioned:
3- or 4-β-sulphatoethylsulphonyl aniline,
4-methyl-3-β-sulphatoethylsulphonyl aniline,
2-methoxy-5-β-sulphatoethylsulphonyl aniline also the monocondensation products of the diamines and the halides or anhydrides of acids or heterocyclic compounds disclosed above.

The dyes of formula (1) wherein the cellulose-reactive group Z is a s-triazine nucleus substituted by a chlorine or bromine atom and an amino or substituted amino group can also be obtained by reacting a cellulose-reactive dye of formula (1) in which Z is a dichloro- or dibromo-s-triazine group with ammonia or an amine.

The cellulose-reactive dyes of formula (1) wherein the cellulose-reactive group is a s-triazine nucleus substituted by $SO_3H$, a quaternary ammonium group or a group of formulae (2), (3) and (4), can be obtained by reacting a cellulose-reactive dye of formula (1) containing a s-triazine group substituted by at least one chlorine or bromine atom with an alkali metal salt of sulphurous acid, a tertiary amine or a compound of formulae (8), (9) and (10).

These reactions also may be carried out by stirring the reactants together in an aqueous medium at a suitable temperature which, in general, will be within the range of 30°–95°C, and maintaining the pH at an appropriate value by addition of an acid-binding agent. In the case where ammonia or amine is the reactant, an excess can be used to act as acid-binding agent. Otherwise, sodium carbonate or sodium hhdroxide may conveniently be used as acid-binding agent.

The new dyestuffs may be used for colouring a variety of textile materials for example natural proteins such as wool, silk and leather, superpolyamides and, more especially natural or regenerated cellulose textile materials such as cotton, linen and viscose rayon. For colouring the cellulose materials the dyestuffs are preferably applied by printing or dyeing the material in conjunction with a treatment with an acid-binding agent, e.g. caustic soda, sodium carbonate, sodium triphosphate or sodium silicate, which may be applied to the textile material before during or after the application of the dyestuff. When so applied the new dyestuffs react with the cellulose and yield brilliant yellowish-red to bluish-red shades of excellent fastness to washing and surprisingly high fastness to light. In addition, many of the new dyestuffs give shades which fluoresce when exposed to ultra-violet light. This property can be used to advantage in the production of multicoloured materials, e.g. by conventional textile printing methods used with cellulose-reactive dyes or by more recently developed methods in which a plurality of reactive dyes are applied in streams to a moving textile fabric in order to produce a pattern; e.g. as described and claimed in U.K. Specification No. 1,243,403. The dyes can, e.g. be used in conjunction with fluorescent brightening agents of high substantivity to broaden the range of shades obtainable under the influence of U.V. light.

The invention is illustrated but not limited by the following examples in which parts are by weight:

EXAMPLE 1

5 parts of the anhydrous dyestuff, CI Acid Red 52 are added to 80 parts of chlorosulphonic acid at such a rate that the temperature does not rise above 10°C. The solution is then heated to 70° and stirred for 17 hours, then cooled and poured into 450 parts of ice and 150 parts of water. The precipitate is rapidly filtered off, washed quickly with 100 parts of ice-cold water and added to a solution of 5 parts of N-$\beta$-hydroxyethylethylene diamine in 100 parts of water. The mixture is stirred at room temperature and pH 9-10 for 2 hours, then the solid product is filtered off and washed with 50 parts of ice-cold water.

2 parts of cyanuric chloride are dissolved in 10 parts of warm acetone and the solution is added to a stirred mixture of 50 parts of ice, 50 parts of water and 1 part of dispersing agent. A solution of 1.7 parts of metanilic acid in 50 parts of water at 0°-5°, pH 6-7 are added to the suspension and the mixture is stirred at 0°-5°, pH 6-7 for one-half hour. The mixture is filtered, the product from paragraph 1 is added to the filtrate and the mixture is stirred at 35°-40°, pH 9 for 1½ hours. Salt is added to give a concentration of 100 g/l and the precipitate is filtered off and dried.

The product contains 1.1 atoms of hydrolysable chlorine per mole of dyestuff. When applied to cellulosic fibres in conjunction with an acid-binding agent, it dyes the fibres in brilliant bluish-red shades with good fastness to washing.

EXAMPLE 2

If the 5 parts of N-$\beta$-hydroxyethylethylenediamine used in Example 1 are replaced by 10 parts of 60% aqueous ethylenediamine, the dyestuff obtained dyes cellulosic fibres is brilliant bluish-red shades of similar fastness properties.

EXAMPLE 3

5 parts of anhydrous CI Acid Red 52 are converted to the sulphonyl chloride as described in Example 1. The isolated paste is quickly added to a solution of 4.5 parts of 1,4-phenylenediamine-2-sulphonic acid in 150 parts of water at pH 7 and 20°C. The mixture is stirred at room temperature, pH 6-7 for 2 hours, a clear solution being obtained. Salt is added to give a concentration of 150 g/l and the precipitate is filtered off. The filter cake is dissolved in 100 parts of water at pH 6-7, the solution cooled to 0°-5° and added to a suspension of cyanuric chloride (3 parts), water (50 parts), ice (50 parts) and dispersing agent (1 part). The mixture is stirred for 1 hour at 0°-5°, pH 6-7 then filtered, and with 2 parts of potassium dihydrogen phosphate and 1 part of disodium hydrogen phosphate are added followed by sufficient salt to give a concentration of 200 g/l. The precipitate is filtered off, pasted with 1 part of potassium dihydrogen phosphate and dried in vacuo at room temperature. The product contains 2 atoms of hydrolysable chlorine per mole of dyestuff. When applied to cellulosic fibres in conjunction with an acid-binding agent, it dyes the fibres in brilliant reddish-mauve shades with good fastness to washing.

EXAMPLE 4

If the 1,4-phenylenediamine-2-sulphonic acid used in Example 3 is replaced by an equal quantity of 1,3-phenylenediamine-4-sulphonic acid a dyestuff with similar shade and fastness properties is obtained.

EXAMPLE 5

10 parts of anhydrous CI Acid Red 52 are converted to the sulphonyl chloride as described in Example 1. The isolated paste is quickly added to 100 parts of cold ammonia solution ($d = 0.88$) and the mixture is stirred at room temperature for 2 hours. The sulphonamide is precipitated by acidifying to pH 7 with concentrated hydrochloric acid (36°Tw) and filtration and is then suspended in a mixture of acetone (40 parts), water (100 parts), and wetting agent (1 part) at 0°-5°, pH 10-11 and stirred vigorously while a solution of 5 parts of cyanuric chloride in 30 parts of acetone are added during the course of 1 hour, the pH during the course of the addition and for a further one-half hour being maintained at 10-11 by occasional addition of 2N sodium carbonate solution, and the temperature being maintained at 0°-5° by external cooling. The pH is then adjusted to 6-7 by dropwise addition of 2N hydrochloric acid solution and the dyestuff isolated by filtration, washed with 20 parts of ice cold water and dried in vacuo. It contains 1.8 atoms of hydrolysable chlorine per mole of dyestuff and dyes cellulosic fibres in conjunction with an acid-binding agent in fast bluish-red shades.

The examples in the following table are of dyestuffs in which the sulphonyl chloride from CI Acid Red 52 are condensed with an excess of the diamine in column II and the product so obtained acylated with the acylating agent described in column III.

| Example | II | III | Shade on Cellulose |
|---|---|---|---|
| 6 | 4,4'-Diaminodiphenylether-3,3'-disulphonic acid | Cyanuric chloride | Bluish-red |
| 7 | 4,4'-Diaminostilbene-2,2'-disulphonic acid | do. | do. |
| 8 | 4,4'-Diaminodiphenyl-2,2'-disulphonic acid | do. | do. |
| 9 | 4,4'-Diamino-3,3'-dimethyldiphenyl-2,2'-disulphonic acid | do. | do. |
| 10 | 4,4'-diamino-3,3'-dimethoxydiphenyl-2,2'-disulphonic acid | do. | Violet |

EXAMPLE 11

10 Parts of the anhydrous dyestuff, CI Acid Red 50, are converted to the sulphonyl chloride in the same way as for CI Acid Red 52 in Example 1. The isolated paste is quickly added to a stirred solution of 1.8 parts of 2,5-diaminobenzene sulphonic acid in 800 parts of water and the mixture is stirred at room temperature, pH 6–7 for 18 hours, a clear solution being obtained. 200 Parts of sodium chloride are added and the product is isolated by filtration. It is then dissolved in 200 parts of water, 50 parts of ice and one part of dispersing agent, and to the solution stirred at 0°–5° are added a solution of 1 part of cyanuric chloride in 10 parts of acetone. The suspension is stirred for 2 hours at 0°–5°, pH 6.5, screened, and the product isolated by the addition of 40 parts of sodium chloride. The product is isolated by filtration, intimately mixed with 0.4 parts of potassium dihydrogen orthophosphate and 0.2 parts of disodium hydrogen orthophosphate and dried in vacuo at room temperature. On analysis the deystuff is found to contain 2.2 moles of hydrolysable chlorine per mole of dyestuff and, when applied to cellulosic fibres in conjunction with an acid-binding agent, to dye the fibre in brilliant pink shades with good fastness to washing.

In the examples in the following table the sulphonyl chloride from CI Acid Red 50 is condensed with an excess of the diamine in column II and the product then acylated with the acylating agent in column III.

EXAMPLE 44

Replacement of CI Acid Red 52 in Example 1 with an equivalent weight of the acid dyestuff 3,6-bis-N,N-dimethylamino-9-(2',4'-disulphophenyl)xanthene gives, by similar means, a dyestuff which, when applied to cellulose in the presence of an acid-binding agent dyes the fibre in brilliant bluish red shades of good fastness to washing.

The examples in the following table are given in which compounds of formula (13) having the groups $R_1$ – $R_3$ given in column II are converted to the monosulphonyl chloride and reacted with 1 mole of the diamine in column III and the product acylated with the agent in column IV.

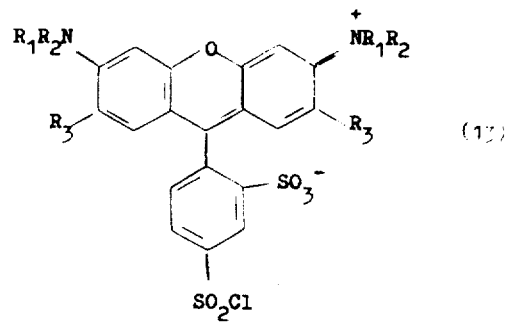

(13)

| Example | II | III | Shade on Cellulose |
|---|---|---|---|
| 12 | Ethylenediamine | 2,4-dichloro-6-(3'-sulphophenylamino)-s-triazine | Pink |
| 13 | 2,5-diaminobenzene sulphonic acid | 2,4-dichloro-6-amino-s-triazine | do. |
| 14 | N-β-hydroxyethylethylenediamnne | 2,4-dichloro-6-(3'-sulphophenylamino)-s-triazine | do. |
| 15 | 2,4-diaminobenzene sulphonic acid | 2,4-dichloro-6-(2',5'-disulphophenylamino)-s-triazine | do. |
| 16 | 2,5-diaminobenzene sulphonic acid | 2,4-dichloro-6-(5'-sulphonaphth-2'-ylamino)-s-triazine | do. |
| 17 | do. | 2,4-dichloro-6-(N-ω-sulphomethylanilino)-s-triazine | do. |
| 18 | do. | 2,4,6-trichloropyrimidine | do. |
| 19 | do. | 2,4,5,6-tetrachloropyrimidine | do. |
| 20 | do. | 5-cyano-2,4,5-trichloropyrimidine | do. |
| 21 | do. | 2,3,-dichloroquinoxaline-6-carbonyl chloride | do. |
| 22 | do. | 4,5-dichloro-6-methyl-2-methylsulphonyl pyrimidine | do. |
| 23 | do. | β-(4,5-dichloropyridaz-3-onyl-1)-propionyl chloride | do. |
| 24 | do. | 3,6-dichloropyridazine-4-carbonyl chloride | do. |
| 25 | do. | 2,4-dichloropyrimidine-5-sulphonyl chloride | do. |
| 26 | 2,5-diaminobenzene sulphonic acid | 2-chlorobenzthiazole-6-carbonyl chloride | Pink |
| 27 | do. | 2,4,6-trifluoro-5-chloropyrimidine | do. |
| 28 | do. | β-(2,2,3,3-tetrafluorocyclobutyl)acryloyl chloride | do. |
| 29 | do. | Carbyl sulphate | do. |
| 30 | do. | 2,4-dichloro-6-[3'-(2''-chloro-4''-amino-s-triazin-6''-ylamino)-4'-sulphophenylamino]-s-triazine | do. |
| 31 | do. | 2,4-dichloro-6-[4'-(2''-chloro-4''-m-sulphophenyl-amino-s-triazin-6''-ylamino)-3'-sulphophenylamino]-s-triazine | do. |
| 32 | do. | 2,5-bis-(2',4'-dichloro-s-triazin-6'-ylamino)-benzene-1,4-disulphonic acid (1 mole) | do. |
| 33 | do. | 4,4'-bis-(2'',4''-dichloro-s-triazin-6''-ylamino)-stilbene-2,2'-disulphonic acid (0.5 mole) | do. |
| 34 | do. | 2,4-dichloropyrimidine-5-carbonyl chloride | do. |
| 35 | do. | β-chloroethylsulphonyl-endomethylene-cyclohexane carboxylic acid chloride | do. |
| 36 | do. | 2,4-dichloro-6-(4'-sulphophenylamino)-s-triazine | do. |
| 37 | 2,5-diaminobenzene sulphonic acid | 2,4-dichloro-6-(2'-methyl-5'-sulphophenylamino)-s-triazine | Pink |
| 38 | do. | 2,4-dichloro-6-(2'-carboxy-4'-sulphophenylamino)-s-triazine | do. |
| 39 | do. | 2,4-dichloro-6-(4'-sulphophenoxy)-s-triazine | do. |
| 40 | do. | 2,4-dichloro-6-methoxy-s-triazine | do. |
| 41 | do. | 2,4-dichloro-6-(6'-sulphonaphth-2'-ylamino)-s-triazine | do. |
| 42 | do. | 2,4-dichloro-6-(5',7'-disulphonaphth-2'-ylamino)-s-triazine | do. |
| 43 | do. | 2,4-dichloro-6-(3',6',8'-trisulphonaphth-1'-ylamino)-s-triazine | do. |

| Example | II | III | IV | Shade on Cellulose |
|---|---|---|---|---|
| 45 | $R_1 = R_2 = nCH_3CH_2CH_2—$<br>$R_3 = H$ | 2,5-diaminobenzene sulphonic acid | 2,4-dichloro-6-m-sulphophenyl-amino-s-triazine | Bluish-red |
| 46 | $R_1 = CH_3CH_2—$<br>$R_2 = R_3 = H$ | do. | do. | Yellowish-red |
| 47 | $R_1 = R_3 = CH_3—$<br>$R_2 = H$ | do. | do. | do. |
| 48 | $R_1, R_2 = —CH_2CH_2CH_2CH —$<br>$R_3 = H$ | do. | do. | Bluish-red |
| 49 | $R_1, R_2 = —CH_2CH_2CH_2CH_2CH_2—$<br>$R_3 = H$ | do. | do. | do. |
| 50 | $R_1, R_2 = —CH_2CH_2OCH_2CH_2—$<br>$R_3 = H$ | do. | do. | Red |
| 51 | $R_2 = $ 4-nitrophenyl<br>$R_1 = R_3 = H$ | 2,5-diaminobenzene sulphonic acid | 2,4-dichloro-6-m-sulphophenyl-amino-s-triazine | Violet |
| 52 | $R_2 = $ 3-nitrophenyl<br>$R_1 = R_3 = H$ | do. | do. | do. |
| 53 | $R_2 = $ 4-chlorophenyl<br>$R_1 = R_3 = H$ | do. | do. | do. |
| 54 | $R_2 = $ 4-bromophenyl<br>$R_1 = R_3 = H$ | do. | do. | do. |
| 55 | $R_2 = $ 4-trifluoromethyl phenyl<br>$R_1 = R_3 = H$ | do. | do. | do. |
| 56 | $R_2 = $ 3,5-dichlorophenyl<br>$R_1 = R_3 = H$ | do. | do. | do. |

EXAMPLE 57

10 Parts of the anhydrous dyestuff CI Acid Blue 1 are converted to the monosulphonyl chloride in a similar manner to Example 1. The paste so obtained is added to a solution of 5 parts of 1,4-phenylenediamine-2-sulphonic acid in 600 parts of water and the mixture is stirred at room temperature and pH 6–7 until a clear solution is obtained. 175 Parts of sodium chloride are added and the precipitate is filtered off and redissolved in 200 parts of water. The solution is cooled to 0°–5°, and 50 parts of ice and 1 part of dispersing agent are added. A solution of 2 parts of cyanuric chloride in 10 parts of acetone are then added and the mixture is stirred at 0°–5°, pH 6–7, for 2 hours, screened and the dyestuff isolated by salting to 25% sodium chloride. The product is isolated by filtrating, intimately mixed with 1 part of potassium dihydrogen orthophosphate and 0.5 parts of disodium hydrogen orthophosphate and dried in vacuo. When applied to cellulosic fibres in conjunction with an acid-binding agent, the dyestuff colours the fibres in brilliant greenish-blue shades fast to washing.

EXAMPLE 58

In place of the 10 parts of CI Acid Blue 1 used in Example 57, there is used an equivalent amount of the dyestuff made by the condensation of benzaldehyde-2,4-disulphonic acid and N,N-diethyl-m-toluidine and subsequent oxidation of the intermediate leuco derivative. A dyestuff having similar shade and properties is obtained.

EXAMPLE 59

In place of the 10 parts of CI Acid Blue 1 used in Example 57 there is used an equivalent amount of the dyestuff made by the condensation of benzaldehyde-2,4-disulphonic acid and 2-N-ethylamine-1,4-xylene and subsequent oxidation of the intermediate leuco derivative. A dyestuff having similar shade and properties is obtained.

Example 60

To a solution of 8.0 parts of the dichlorotriazinyl compound prepared in Example 3 in 200 parts of water, is added a solution of 1.6 parts of p-aminobenzoic acid in 50 parts of water. The mixture is stirred at 35°–40°C for 4 hours maintaining the pH at 6–7 by simultaneous addition of 2N sodium carbonate solution as required. The dyestuff is precipitated by addition of sodium chloride, filtered and dried.

When applied to cellulose textiles in the presence of an acid-binding agent it gives brilliant bluish-mauve shades with good fastness to washing.

In place of the p-aminobenzoic acid used above there may be used an equivalent amount of any of the following products:

| | |
|---|---|
| N-methylmetanilic acid | Example 61 |
| m-aminobenzoic acid | Example 62 |
| 2-naphthylamine-4,8-disulphonic acid | Example 63 |
| aniline-3,5-disulphonic acid | Example 64 |
| 2-aminotoluene-5-sulphonic acid | Example 65 |
| 3-β-sulphatoethylsulphonylaniline | Example 66 |
| 4-β-sulphatoethylsulphonylaniline | Example 67 |
| phenol | Example 68 | when a dyestuff similar in shade is obtained. On cellulose textiles they have good fastness to wet treatments.

Examples 60 to 68 inclusive can alternatively be made by replacing the cyanuric chloride in Example 3 by the primary condensation product of cyanuric chloride and the appropriate compound named in the above table, reaction being carried out at 45°C until one mole of HCl has been liberated. Similarly many of Examples 1 to 59 can be obtained by a similar method to Example 60, i.e. by reacting the appropriate compound of formula (6) with cyanuric chloride, followed by reaction of the product with ammonia or the appropriate amine; thus

| Example | Amine |
|---|---|
| 1 | metanilic acid |
| 2 | do. |
| 13 | ammonia |
| 14 | metanilic acid |
| 15 | aniline-2,5-disulphonic acid |
| 16 | 2-naphthylamine-7-sulphonic acid |
| 17 | aniline-N-ω-methane sulphonate |
| 32 | 2,4-dichloro-6-(4'-amino-2',5'- |

| Example | Amine |
|---|---|
| | disulphoanilino) s-triazine |
| 36 | sulphanilic acid |
| 37 | 2-aminotoluene-4-sulphonic acid |
| 38 | 2-amino-5-sulphobenzoic acid |
| 39 | phenol-4-sulphonic acid |
| 41 | 2-naphthylamine-6-sulphonic acid |
| 42 | 2-naphthylamine-5,7-disulphonic acid |
| 43 | 1-naphthylamine-3,6,8-trisulphonic acid |
| 44–56 | metanilic acid |

Further examples are given in the Table below when compounds of formula (13) having the indicated means of $R_1$, $R_2$ and $R_3$ are converted to the monosulphonyl chloride and reacted with one mole of the diamine in column III, acylated with cyanuric chloride and the product finally condensed with the compound in Column IV.

| Example | II | III | IV | Shade on Cellulose |
|---|---|---|---|---|
| 69 | $R_1 = CH_3CH_2$<br>$R_2 = CH_3$<br>$R_3 = H$ | 1,4-phenylenediamine-2-sulphonic acid | metanilic acid | Brilliant Bluish-red |
| 70 | do. | do. | sulphanilic acid | do. |
| 71 | do. | 1,3-phenylenediamine-4-sulphonic acid | 2-aminotoluene-4-sulphonic acid | do. |
| 72 | do. | do. | 5-sulphoanthranilic acid | do. |
| 73 | do. | do. | ammonia | do. |

EXAMPLE 74

A solution of 8.5 parts of the dyestuff prepared in Example 1 in 200 parts of water is stirred at 60°C. To the solution is then added 1 part of pyridine and 2 parts of sodium sulphite and the solution stirred at 60°C until the chlorine atoms have been replaced by $SO_3H$, as judged by estimation of liberated sodium chloride. The dyestuff is precipitated by addition of sodium chloride and dried. When applied to cellulose it gives brilliant bluish-red shades which are fast to washing.

In place of the dyestuff of Example 1 used above there may be used an equivalent amount of any of the dyestuffs 11 to 15 inclusively. When applied to cellulose they give pink shades with good fastness to washing.

EXAMPLE 75

To a solution of the dichlorotriazinyl compound prepared in Example 3 in 200 parts of water is added a solution of 2.6 parts of aniline-3,5-disulphonic acid in 500 parts of water. The mixture is stirred at 35°–40° for 4 hours, maintaining the pH at 6–7 by simultaneous addition of 2N sodium carbonate solution as required. The product is isolated by the addition of sodium chloride, collected by filtration and redissolved in 200 parts of water at 20° with stirring. A solution of 2 parts of trimethylamine in 5 parts of water is then added and the mixture is stirred for 30 minutes. The pH of the mixture is then adjusted to 7.0 by the dropwise addition of hydrochloric acid (36°Tw) and the dyestuff is precipitated by the addition of sodium chloride. The precipitate is filtered off and dried at 20°.

When applied to cellulosic materials in conjunction with an acid-binding agent the dyestuff yields bright bluish-mauve shades.

EXAMPLE 76

Replacement of the trimethylamine in Example 75 by an equivalent amount of 1,4-diazabicyclo[2,2,2]octane gives a dyestuff of similar shade and properties.

EXAMPLE 77

Replacement of the trimethylamine in Example 75 by an equivalent of pyridine and heating the solution to 85°C until quaternisation is complete, as judged by estimation of liberated chloride ion, gives a dye which provides bluish mauve shades on cellulose with good fastness to washing.

EXAMPLE 78

If in Example 77, nicotinic acid is used in place of pyridine a similar product is obtained.

EXAMPLE 79

6 parts of anhydrous CI acid Red 52 are converted to the sulphonyl chloride as described in Example 1. The isolated paste is quickly added to a stirred solution of 4 parts of 4-β-sulphatoethylsulphonylaniline in 300 parts of water and 1 part of dispersing agent. The mixture is stirred at 20°–25°, pH 5.5 – 6.5 for 3 hours and then screened. The dyestuff is obtained by salting to 25% w/v sodium chloride, and is collected by filtration and dried in vacuo at 40°. When applied to cellulosic fibres in conjunction with an acid-binding agent, it dyes the fibre in brilliant bluish-red shades with good fastness properties.

The following table describes further Examples of the invention obtained in a similar manner to Example 79 by treating a compound of formula (2) in which the two Ys represent —O— and having the meanings of $R^1$, $R^2$ and n indicated in columns 2, 3 and 4 with chlorosulphonic acid, and reacting the derived sulphonchloride with the amine named in column 5.

| Example | $R_1$ | $R_2$ | N | Amine | Shade on cellulose |
| --- | --- | --- | --- | --- | --- |
| 80 | $CH_3CH_2-$ | $CH_3CH_2-$ | 0 | 3-($\beta$-sulphatoethylsulphonyl)-aniline | Bluish-red |
| 81 | do. | do. | 0 | 2-methoxy-5-($\beta$-sulphatoethylsulphonyl)-aniline | do. |
| 82 | do. | do. | 0 | 2-methoxy-5-methyl-4-($\beta$-sulphatoethylsulphonyl)-aniline | do. |
| 83 | do. | H | 1 | do. | Yellowish-red |
| 84 | do. | do. | 1 | 2-methoxy-5-($\beta$-sulphatoethylsulphonyl)-aniline | do. |
| 85 | do. | do. | 1 | 3-($\beta$-sulphatoethylsulphonyl)-aniline | do. |
| 86 | do. | do. | 1 | 4-($\beta$-sulphatoethylsulphonyl)-aniline | do. |
| 87 | $CH_3$ | $CH_3$ | 0 | do. | Bluish-red |
| 88 | $CH_3CH_2-$ | H | 0 | 3-($\beta$-sulphatoethylsulphonyl)-aniline | Yellowish-red |
| 89 | $CH_3$ | do. | 1 | do. | do. |
| 90 | $CH_3CH_2CH_2-$ | do. | 1 | do. | do. |
| 91 | $CH_3CH_2CH_2CH_2-$ | do. | 1 | do. | do. |
| 92 | $-CH_2CH_2CH_2CH_2CH_2-$ | | 0 | 4-($\beta$-sulphatoethylsulphonyl)-aniline | Bluish-red |
| 93 | $-CH_2CH_2CH_2CH_2-$ | | 0 | do. | do. |
| 94 | $-CH_2CH_2-O-CH_2CH_2-$ | | 0 | do. | Yellowish-red |
| 95 | $-CH_2CH_2-SO_2-CH_2CH_2-$ | | 0 | do. | do. |
| 96 | $C_2H_5$ | $C_2H_5$ | 0 | 2-($\beta$-aminoethylamino)-4-chloro-6-m-sulphoanilino)-2-s-triazine | Bluish-red |
| 97 | H | $CH_3$ | 0 | 2-(4'-amino-3'-sulphoanilino)-4-chloro-6-(m-sulphoanilino)-s-triazine | do. |

We claim:

1. A compound of the formula

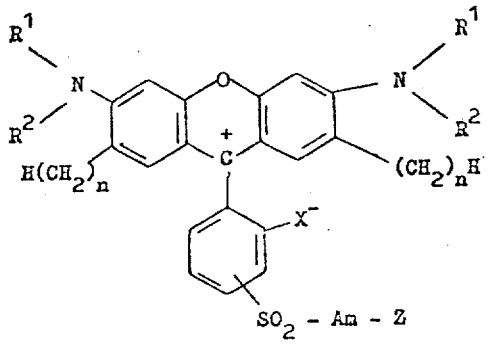

wherein
- $R^1$ represents hydrogen or alkyl having 1–4 carbon atoms;
- $R^2$ represents alkyl having 1–4 carbon atoms, phenyl or phenyl having 1–2 substituents selected from the group consisting of $NO_2$, Cl, Br, and $CF_3$;
- each $n$ independently represents 0 or 1;
- $X^-$ represents $SO_3^-$ or $CO_2^-$
- Am is NH or a diamine selected from the group consisting of ethylene diamine, N-$\beta$-hydroxyethyl ethylene diamine, 1,4-phenylenediamine-2-sulphonic acid, 1,3-phenylenediamine-4-sulphonic acid, 4,4'-diaminodiphenylether-3,3'-disulphonic acid, 4,4'-diaminostilbene-2,2'-disulphonic acid, 4,4'-diaminodiphenyl-2,2'-disulphonic acid, 4,4'-diamino-3,3'-dimethyldiphenyl-2,2'-disulphonic acid and 4,4'-diamino-3,3'-dimethoxydiphenyl-2,2'-disulphonic acid, the said $SO_2$ being attached to one of the two nitrogens of said diamine and the said Z being attached to the other of said diamine nitrogens, and
- Z has the formula

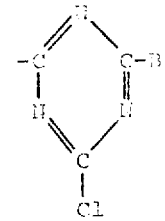

wherein B is selected from the group consisting of Cl; $NH_2$; anilino substituted by up to 2 substituents selected from $SO_3H$, $CH_3$ and COOH; N-$\omega$-sulphomethylanilino; N-methyl sulphoanilino; aminodisulphoanilino; naphthylamino substituted by up to 3 $SO_3H$ groups; sulphatoethylsulphonylanilino; methoxy; phenoxy; sulphophenoxy; and sulphoanilino and disulphoanilino, both of which are further substituted by a member selected from 2-chloro-4-amino-s-triazin-6-ylamino, 2-chloro-4-sulphophenylamino-s-triazin-6-ylamino and dichloro-s-triazinylamino.

2. A compound as claimed in claim 1 having the formula:

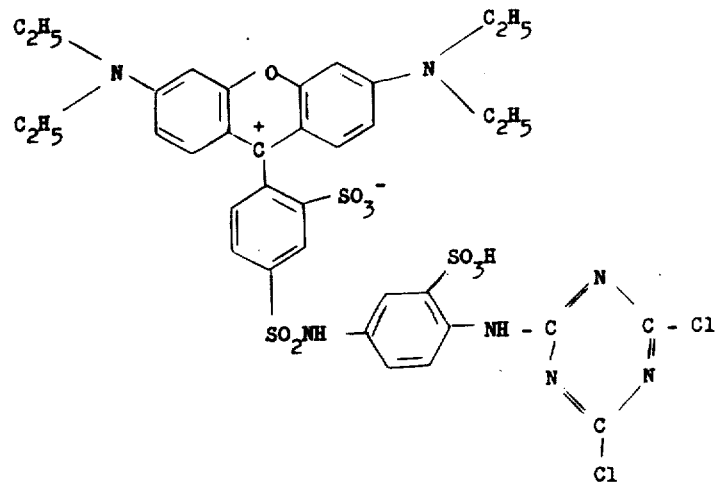

* * * * *